July 13, 1926.
J. M. PEELLE
SCOOTER
Filed Oct. 17, 1925
1,592,701
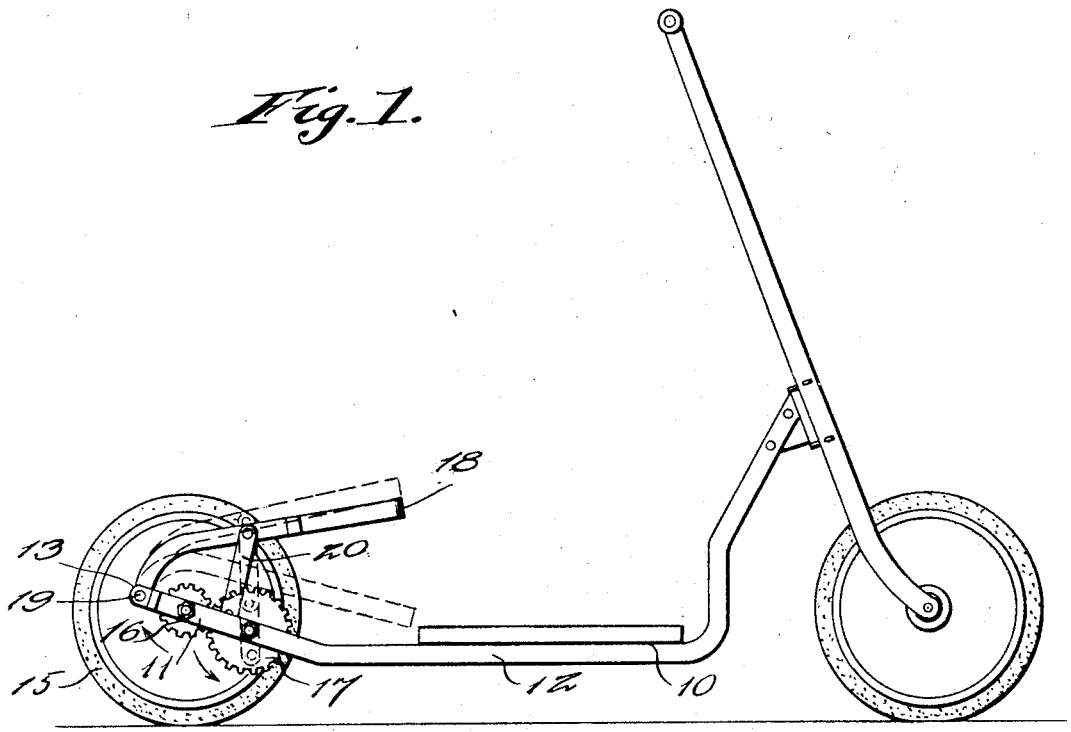
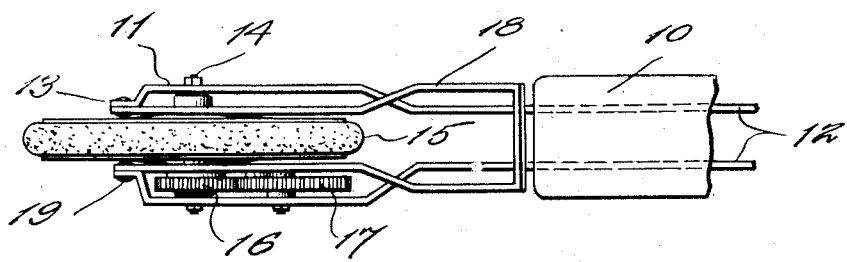
J. M. Peelle
INVENTOR
BY Victor J. Evans
ATTORNEY
WITNESS:

UNITED STATES PATENT OFFICE.

JAMES M. PEELLE, OF CENTERVILLE, INDIANA.

SCOOTER.

Application filed October 17, 1925. Serial No. 63,083.

This invention relates to improvements in toys, and especially to that form of toy commonly known as scooters, usually being propelled upon one foot of the driver while the other foot of the driver or user being used as a tread for engagement with a pavement and forming the medium of propulsion therefor, while the present invention provides a gearing apparatus associated with the rear wheel of the scooter and operated by the heel of the user or operator.

Another object of my invention resides in the construction of the propulsion apparatus per se in constituting a pedal for engagement by the user's heel and having a pivoted length associated with the pedal and propulsion gear, which, in turn, being associated with the gear upon the rear driving wheel whereby both of the driver's feet may be kept upon the scooter during the process of propulsion and hence obliterating the necessity of using one foot as a tread.

A further object of my invention being that the person so using the scooter may stand upon the pedal in providing a brake for the scooter owing to the binding of the gears, and obliterating the necessity of scraping a shoe upon the pavement.

With the above and other objects in view, the invention further includes the following novel features and details of construction, to be hereinafter more fully described, illustrated in the accompanying drawing and pointed out in the appended claim.

In the drawing:—

Figure 1 is a side elevation of the scooter with my invention applied.

Figure 2 is a fragmentary top plan view of the scooter and propulsion apparatus constituting my invention.

Referring to the drawing in detail, wherein like character of reference denote corresponding parts, the reference character 10 indicates a scooter of the conventional and well known type but yet providing additional lengths 11 upon the rear end portions of the side frame members 12 and terminating in inwardly extending spaced parallel apertured end portions 13, the purpose of which will be presently apparent.

An axle 14 journaled within the opposite sides of the companion side frame members 12 of the scooter 10 for the support of a rear driving wheel 15 having a keel mounted upon one side thereof and in constant mesh with a relatively large gear 17 mounted upon the inner side of one of the side members 12 adjacent the keel 16.

In order to provide propulsion means for rotating the relatively large gear 17 in imparting the momentum attained thereby to the gear 16 and rear driving wheel 15, I provide a yoke or pedal 18 having its opposite ends pivoted as at 19 to the spaced parallel apertured end portions 13 of the frame members 12 while its closed or yoke end being disposed immediately behind the platform of the scooter 10. A pivoted length 20 having its opposite ends mounted upon one side of the pedal or yoke 18 while its opposite end being eccentrically mounted upon the inner side of the relatively large gear 17 whereby the pedal or yoke 18 when reciprocated relative to the dotted line position as clearly illustrated in Figure 1 of the drawing will impart the necessary momentum to the rear driving wheel 15.

The invention is susceptible of various changes in its form, proportions and minor details of construction, and the right is herein reserved to make such changes as properly fall within the scope of the appended claim.

Having thus described my invention, what I claim is:—

A scooter of the character described comprising a rear driving wheel having a fixed gear arranged upon one side thereof, a relatively large propulsion gear journaled upon the scooter frame and meshing with the fixed gear of the rear driving wheel, a yoke shaped pedal mounted upon the scooter frame and extending forwardly adjacent the platform thereof, and a pivoted link mounted upon the pedal and being eccentrically associated with the relatively large propulsion gear whereby the operator may exercise a reciprocating foot pressure upon the pedal in constituting the propulsion means for the scooter.

In testimony whereof I affix my signature.

JAMES M. PEELLE.